United States Patent [19]

Clapham

[11] Patent Number: 4,804,963
[45] Date of Patent: Feb. 14, 1989

[54] WIDE DYNAMIC RANGE DIGITAL RECEIVER

[75] Inventor: Robert G. Clapham, Seattle, Wash.

[73] Assignee: Honeywell Inc., Minneapolis, Minn.

[21] Appl. No.: 307

[22] Filed: Jan. 5, 1987

[51] Int. Cl.⁴ .......................... G01S 3/74; G01S 7/44
[52] U.S. Cl. .................................... 342/195; 342/368; 342/374; 367/105
[58] Field of Search ................. 342/13, 194, 195, 368, 342/377, 417, 445, 374; 364/514 (U.S. only), 516, 517, 133, 131; 367/103, 119, 138, 105

[56] References Cited

U.S. PATENT DOCUMENTS

| | | | |
|---|---|---|---|
| 4,336,607 | 6/1982 | Hill et al. ............................ | 367/123 |
| 4,549,286 | 10/1985 | Langeraar et al. ............ | 367/103 X |
| 4,635,061 | 1/1987 | Lepere et al. ....................... | 342/195 |
| 4,686,532 | 8/1987 | McAulay .............................. | 342/195 |

OTHER PUBLICATIONS

Corsini et al, *Special Purpose Computer for Video Signal Processing in Radar Sys.*, IEE Proc., vol. 127, Pt. E, No. 4, Jul. 1980, pp. 109-119.

Pridham et al, *A Novel Approach to Digital Beamforming*, J. Acoust. Soc. Am., 63(2), Feb. 1978, pp. 425-434.

Bartram et al, *Fifth Generation Digital Sonar Signal Processing*, EASCON Conf. 1976, Wash. D.C., Sep. 1976.

*Primary Examiner*—Theodore M. Blum
*Assistant Examiner*—Gilberto Barrón, Jr.
*Attorney, Agent, or Firm*—Orrin M. Haugen; Thomas J. Nikolai; Frederick W. Niebuhr

[57] ABSTRACT

A wide dynamic range digital receiver for radar or sonar applications wherein the wide dynamic range is achieved by increasing the sampling rate of the received signals through the use of a special purpose microprogrammed digital receiver processor implemented with a plurality of processing elements especially designed for performing sum of products' computations on a pipelined basis. The processing elements utilize VHSIC technology to achieve multiplication of two 24-bit operands at nanosecond rates.

2 Claims, 2 Drawing Sheets

WIDE DYNAMIC RANGE DIGITAL RECEIVER

The Government has rights in this invention pursuant to Contract No. N00024-83-C-6254, awarded by the Department of the Navy.

BACKGROUND OF THE INVENTION

I. Field of the Invention

This invention relates generally to a wide dynamic range digital receiver which is useful in the processing of sensor data, and more particularly to such a receiver exhibiting wide dynamic range in radar, sonar, communication, navigation and infrared systems.

II. Discussion of the Prior Art

Many systems employ sensors and filters to provide spatial discrimination and frequency discrimination against unwanted signals by linearly combining, in a very specific manner, the signals from a distributed array of sensors wherein each sensor in the array converts the received acoustic or electromagnetic signal into an electronic signal. Each sensor signal from the array is operated on in accordance with a specific mathematical formula such that a signal arriving from a specific direction relative to the orientation of the array of sensors is enhanced (amplified) and signals arriving from all other directions are suppressed. The operations on the sensor signal are performed in prior systems by analog electronic components, such as delay lines, phase shifters and summing amplifiers. Sensor signals are also operated on in accordance with a specific mathematical formula such that signals within a specific range of frequencies are enhanced (amplified) and signals outside the specific range of frequencies are suppressed. The filtering operations performed on the signals were implemented in prior systems with analog electronic components, such as capacitors, inductors, resistors and amplifiers. Analog components used to perform the operations required for spatial or frequency discrimination have the inherent problem that the components have a tolerance about their specified values and these values change with temperature and time, thereby making it impossible to implement the operations exactly as defined by the mathematics. The operations can be implemented exactly with no tolerances or variability with time or temperature using digital techniques.

The measure of performance in a receiver system is the accuracy to which a target can be localized, the sensitivity of the receiver to detect weak targets in the presence of environmental noise, and the dynamic range of the receiver, such that weak signals are not obscured by adjacent unwanted or interfering signals.

There exists a fairly well developed body of knowledge useful in predicting the theoretical limits of performance of receiver systems which also provides insight to the realization of near optimal performance. An example of this knowledge is contained in the text, *Filtering in the Time and Frequency Domains*, Blinchikoff and Zverev, John Wiley and Sons, 1976.

Early receiver systems were substantially analog in nature. All filtering functions were performed by hundreds of high precision circuit elements, resistors, inductors and capacitors. Later systems minimized the reliance on precision analog components by performing some of the filtering in the digital domain using specialized digital logic devices, e.g., digital multipliers, adders and digital shift registers. More recently, these functions have been accomplished using one or more stored program digital computers. A disadvantage of these digital techniques is that the receiver dynamic range is less than the dynamic range of an equivalent receiver implemented with analog components.

Digital signal processing has yielded a number of very important benefits. First, the process can be scaled to any frequency regime. Second, the processing errors can be reduced to very small deterministic values by choosing an appropriate size digital word, i.e., the error decreases as the length or precision of the digital word is increased.

Digital signal processing requires that each analog sensor signal be converted to a digital representation. In this process, the analog signal is sampled at a regular time interval, $\Delta t$, by an analog-to-digital converter (ADC) which converts the magnitude and polarity to a binary numerical representation. The signal is thus quantized in amplitude at regular intervals. The quantization process imposes new constraints upon the performance of the system. A critical requirement is that the sampling frequency must be at least twice the bandwidth of the signal of interest. This requirement is generally known as the Nyquist criteria. If this criteria is not met, error is introduced through the phenomenon of aliasing in which signal components outside the band of interest are superimposed on the signals within the band of interest.

Another constraint on the system is the reduction of dynamic range due to quantization noise introduced by the ADC. The dynamic range is defined as the ratio between the maximum input signal to the quantization noise density (i.e., noise power in a 1 Hz bandwidth). The maximum input signal, Sm, is scaled to correspond to the maximum linear input voltage to the ADC, typically 10 volts. The quantization interval of the ADC is determined by the weighting of the least significant bit of the ADC and is thus equal to Sm divided by $2^{n-1}$, where n is the number of bits in the ADC output. Quantization noise arises out of the difference between the actual value of the input signal sample and the quantized value at each sample and varies uniformly over the quantization interval. For an ADC with uniform quantization intervals, q, the quantization error probability density function is given by

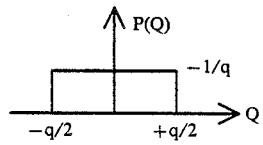

The quantization error noise power is given by $$N_q = \frac{1}{q} \int_{-q/2}^{+q/2} Q^2 \, dQ = \frac{q^2}{12}$$

The quantization error noise power is uniformly spread in frequency from 0 to $\frac{1}{2}$ the sampling frequency, FS. The quantization noise density $Q_n$, i.e., the RMS value of the quantization noise in a one hertz bandwidth, is thus a function of both the quantization interval and the sample frequency and is given by the equation:

$$Q_n = 20 \log [2S_m/(2^n - 1)(\sqrt{12})] - 10 \log (FS/2) \quad \text{EQ.1}$$

Then, the dynamic range, DR, can be expressed as:

$$DR = 20 \log S_m - 20 \log [S_m/(2^n - 1)(\sqrt{12})] + 10 \log (FS/2)] = 20 \log [2^n - 1)/(\sqrt{12})] + 10 \log (FS/2) - 6 \, dB \quad \text{EQ.2}$$

It can thus be seen from equation 2 that the DR of the ADC (or receiver) increases as the sample frequency, FS, is increased for a fixed binary word size out of the ADC. The present invention makes use of this relationship.

SUMMARY OF THE INVENTION

This invention utilizes digital processing of the sensor signals to accomplish the receiver functions of spatial and frequency discrimination against unwanted or interfering signals. It also utilizes relatively high sample rates for the analog to digital conversion of the sensor signal to maintain the ADC quantization noise level below the minimum effective ambient or self noise level at the output of the sensor while simultaneously maintaining a receiver dynamic range greater than or equal to the dynamic range achievable with an analog implementation of a functionally equivalent receiver.

The relatively high ADC sample rate of the sensor output signals in turn requires the digital processing electronics which implement the receiver spatial and frequency discrimination functions to be capable of performing multiplication and addition at a high rate. Typical rates for the digital receiver processing exceed $10^9$ floating point multiplication and additions per second. Typical applications require the digital receiver processor with these computational capabilities to be implemented within a volume of 0.1 cubic feet or less. Very high speed integrated circuit (VHSIC) technology is applied in a unique manner to realize a wide dynamic range digital receiver. The VHSIC technology is used to realize a high resolution, high speed, and low power ADC in a small volume. The VHSIC technology is also utilized to realize the digital processing electronics required to perform the arithmetic operations (multiplications and additions) at the required speed within the volume and power constraints allocated to these arithmetic operations. This invention embodies a unique architecture in the implementation of the digital processor. This architecture is referred to as "single instruction multiple data" (SIMD). The SIMD implementation utilizes a single VHSIC to provide control data to multiple VHSIC processing elements (PE) operating in parallel wherein each PE performs the same arithmetic operation on independent data from the sensors. The controller is a single IC as is a PE. Typical computational speeds for a PE are 25 million floating point multiplications and additions per second.

OBJECTS OF THE INVENTION

The principal object of this invention is to provide an improvement in the dynamic range of a receiver system using practically realizable digital electronic elements. In the preferred embodiment, the receiver is designed to accommodate the acoustic signals of a sonar receiver. However, the principle taught in this invention may well be extended to other similar receiver applications.

A further object of the invention is to eliminate or greatly minimize and simplify the analog circuitry required in prior art receiver systems.

A still further object of the invention is to provide a wide dynamic range receiver obviating the need for complex analog electronic components.

These and other objects and advantages of the invention will become apparent from the following description of a preferred embodiment when considered in conjunction with the accompanying drawings.

DESCRIPTION OF THE PREFERRED EMBODIMENT

Figure 1:
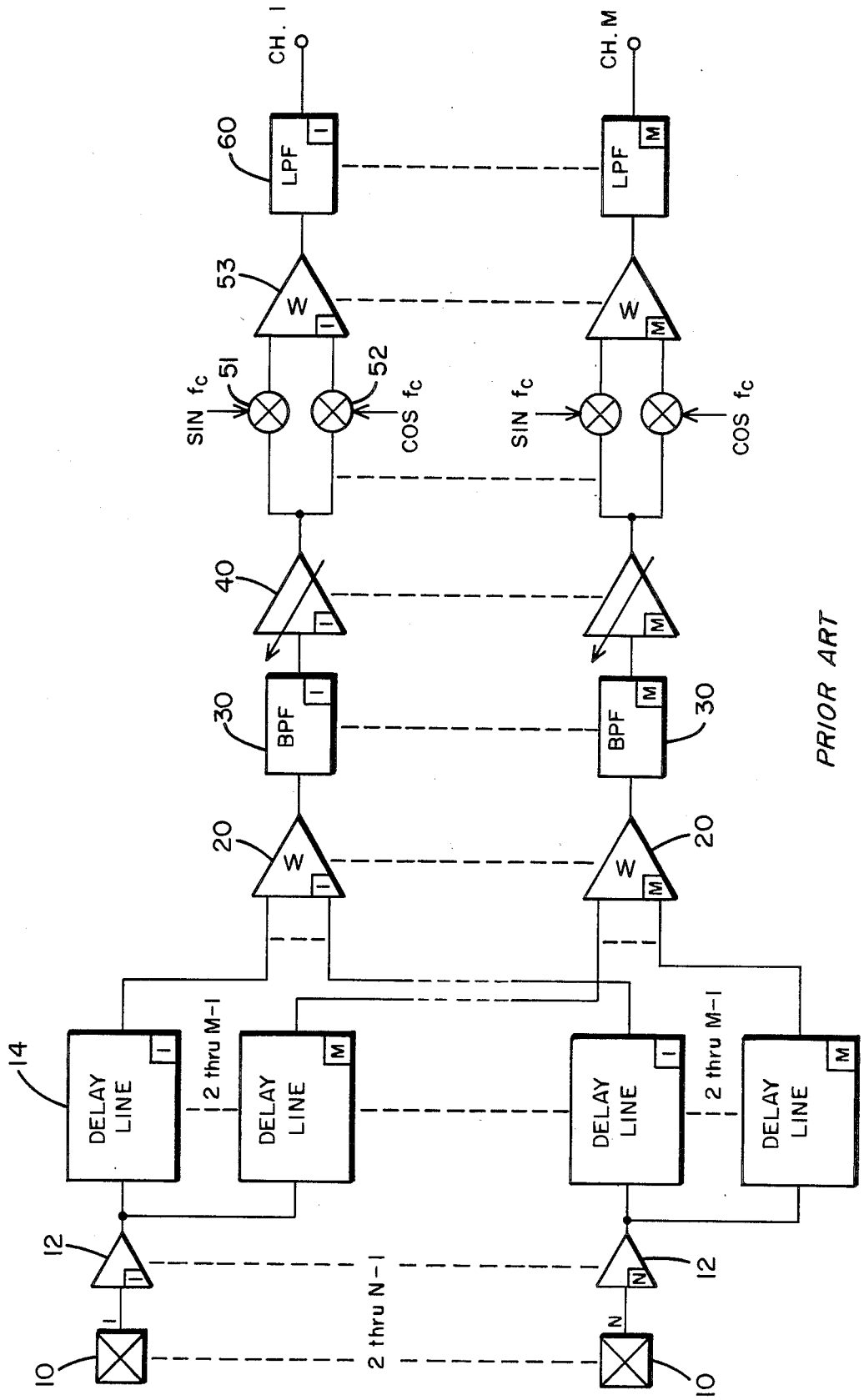
FIG. 1 is a block diagram of a prior art receiver over which the present invention is an improvement.

FIG. 1 shows a block diagram of a typical prior art receiver system. The received signal is picked up and transformed into a voltage by a plurality of N sensors 10, which are distributed in space, and amplified to a convenient voltage level by N corresponding preamplifiers 12.

The preamplified signals are then passed through delay lines 14 (or phase shift networks) wherein N delay lines (i.e., one delay line per sensor) delay the signals from the N sensors such that the delayed signals out of the delay lines are all in phase for a signal arriving at the sensor from a specific direction. Signals arriving at the sensor from some other direction will not be in phase at the output of the delay lines.

The signals out of the delay lines (14) with the same numerical designation (1 thru M) are summed by the summing amplifier (20) with the corresponding numerical designation thru M). The outputs of the summing amplifiers (20) are M beam formed signals wherein each beam formed signal is an amplification of signals arriving from some direction (1 thru M) and a suppression of signals arriving from all other directions. The beamforming process performed by the summing amplifiers (20) is imperfect due to gain and phase errors introduced by the inherent design of summing amplifiers and the tolerances/variations with time and temperature of the analog components. This limits the capability of the analog receiver to spatially discriminate between wanted and unwanted signals.

Completing a description of a typical prior art receiver system, the beam formed signals out of summing amplifiers (20) are then normally input to a bandpass filter (30) wherein signals outside a frequency band of interest are eliminated. In prior art systems, these filters are implemented with analog components such as inductors, capacitors, resistors and amplifiers or equivalents thereof. It is impossible to design analog bandpass filters (30) such that the gain and phase characteristics of these filters as a function of frequency are identical for all M filters under all operating input signal level and temperature conditions. Some receiver applications require the gain and phase characteristics for two or more of the M channels be identical over all operating signal levels and temperatures to achieve the specified performance.

The outputs of the BPF (30) are input to variable gain amplifiers (40) wherein the gain of the amplifier is controlled in accordance with some algorithm such as signal level or as a function of time. The purpose of this amplifier is to compress the dynamic range of the signals applied to modulator components (51) and (52) or to system components to which the receiver outputs are applied.

As mentioned, components (51) and (52) are illustrated as modulators wherein the modulating signals (sin $f_c$ and cos $f_c$) are 90° out of phase with respect to one another and the frequency, $f_c$, is equal to the center frequency of the associated BPF (30). For each channel, the output of modulators (51) and (52) are summed in an amplifier (53) and subsequently passed through a low pass filter (LPF) (60). The output of this LPF (60) is the complex signal of interest wherein this signal occupies the frequency range from $-BW/2$ Hz to $BW/2$ Hz and BW is the bandwidth of the BPF (30). The output of each LPF (60) is the output of the corresponding receiver channel.

Figure 2:
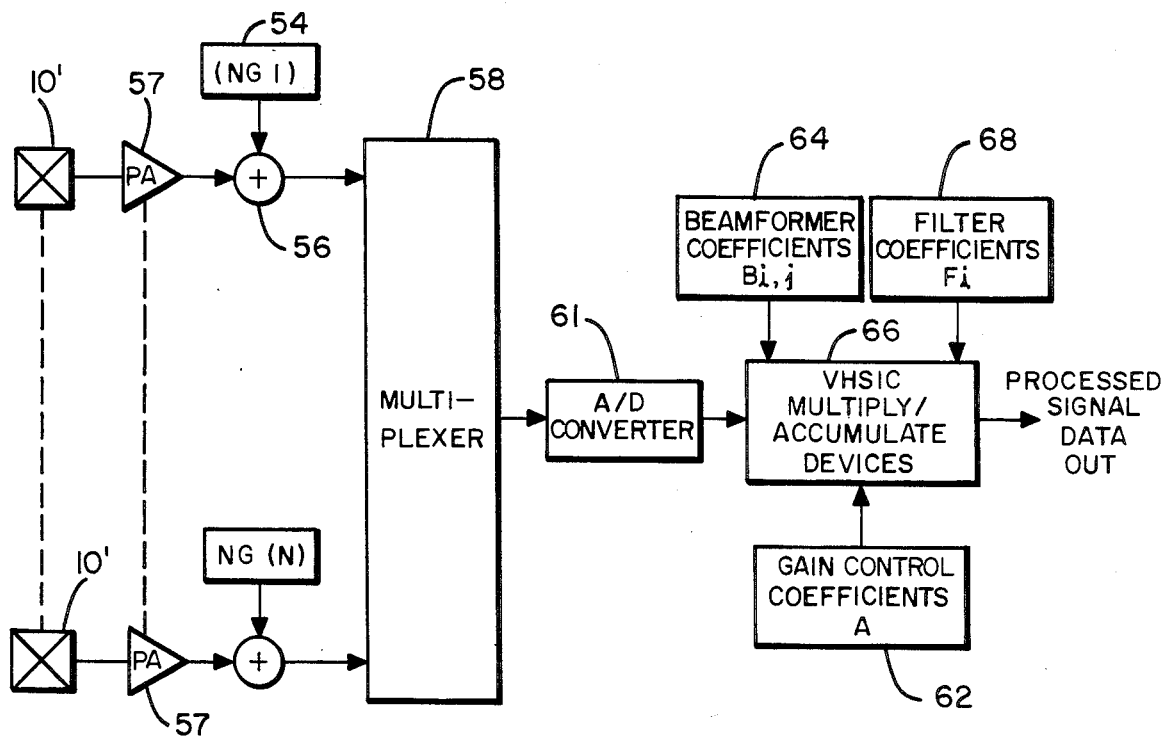
FIG. 2 is a functional block diagram of a wide dynamic range receiver implemented with digital electronic components in accordance with the present invention.

The functional design of the wide dynamic range receiver of the present invention is shown diagrammatically in FIG. 2. The sensors (10') in FIG. 2 are assumed to be the same as the sensors (10) depicted in FIG. 1. The preamps (57) depicted in FIG. 2 are generally the same as the preamps (12) depicted in FIG. 1, except that preamps (57) also include a simple bandpass or low pass filter to limit the frequency content (spectrum) of the signals applied to the ADC (61). This thereby prevents unwanted signals from aliasing into the signal band of interest.

The N-port multiplexer (58) and ADC (61) in FIG. 2 are not a necessary part of this invention but have been included to facilitate an understanding of the overall system aspect of the invention. The multiplexer (58) and ADC (61) provide the function of converting the amplified and low pass filtered analog signals from the sensors (10') to digital signals. This function can be implemented by a multiplexer and high-speed ADC as depicted in FIG. 2. The function can also be implemented by a separate ADC connected to the output of each sensor or any combination of multiplexers and ADC's between these two extremes of implementation for converting the analog signals to sampled, digital data.

A properly designed receiver requires the analog-todigital conversion function be implemented such that the quantization noise (see EQ. 1, supra) is less than the minimum signal in the signal bandwidth of interest. This criteria for the analog-to-digital conversion can be met by a proper selection of a combination of the sample frequency, FS, and number of bits, n, out of the ADC (see EQ. 1). In accordance with the teachings of the present invention, the ADC sample frequency used in a receiver is typically at least one hundred times the minimum theoretical sample frequency required to satisfy the Nyquist criteria.

There are some receiver applications wherein the minimum signal voltage out of the preamp (57) is less than the voltage corresponding to a quantization interval, q, of the ADC.

$$\left( q = \frac{2SM}{2^n - 1} \right).$$

For these applications, the signal from a noise generator (54) is added to the signal of interest prior to the A-to-D conversion as indicated in FIG. 2. The digital output of the ADC becomes a constant for input signals whose peak-to-peak voltage is less than a quantization interval and all information contained within the signal is lost. To overcome this, a random signal with a peak-to-peak amplitude of about 5 q is added to the input signal prior to its application to the ADC. The additive noise signal is designed such that the frequency of this signal is outside the signal band of interest and the added noise signal is subsequently removed by the filters in the receiver.

The digital very high speed integrated circuit multiply/accumulate devices (66) of FIG. 2 perform the following receiver functions of prior art analog receivers:

(a) beamforming performed by delay line elements 14 and summing amplifiers 20 of FIG. 1;

(b) bandpass filtering performed by component 30 of FIG. 1;

(c) gain (signal level) control performed by variable gain amplifier 40 of FIG. 1;

(d) frequency band translation performed by modulators 51 and 52 and summing amplifier 53 of FIG. 1; and (e) low pass filtering performed by component 60 of FIG. 1.

The digital very high speed integrated circuit multiply/accumulate devices perform the following mathematical operations to accomplish the respective receiver functions Beamforming $$S_{o,j} = \sum_{i=1}^{N} S_i(m, j\Delta t)(B_i) \quad \text{EQ. 3}$$

where $S_{o,j}$ is the jth output of the beamformer.

$S_i(m, j\Delta t)$ is a sample of the ith signal at time $(m, j\Delta t)$ and $\Delta t$ is the time between signal samples from the ADC 61.

$B_{i,j}$ is the complex weighting factor to be applied to the ith sensor signal.

Filtering (bandpass and lowpass)

$$S_{o,p} = \sum_{i=1}^{k} (S_{p-k+i})(F_i) \quad \text{EQ. 4}$$

where $S_{o,p}$ is the pth output sample of the filter $F_i$ is the ith complex filter coefficient from component 68 representing the ith sample of the filter impulse response.

$S_{p-k+i}$ is the $(p-k+i)$th sample of the input signal to the filter.

Gain Control $$S_{o,i} = S_i A \quad \text{EQ. 5}$$

where $S_{o,i}$ is the ith output signal sample after gain control
$S_i$ is the ith input signal sample.
A is the gain factor to be applied to the signal.

Frequency Band Translation $$S_{o,s} = (S_s)(C_{q+s}) + (S_i)(S_{q+s}) \quad \text{EQ.6}$$

where
  $S_{o,s}$ is the sth sample out of the frequency translation
  $S_s$ is the sth sample of the input signal
  $C_{q+s}$ and $S_{q+s}$ are the (q+s)th samples of the continuous signal
  Cos $f_c$ and Sin $f_c$ respectively.

The previous equations illustrate mathematically the implementation of the prior art receiver functions of beamforming, filtering, gain control and frequency translation. It is to be particularly noted from the above series of equations that all functions are implemented by the mathematical processes of multiplication and addition. The beamformer, filter, gain and frequency translation coefficients are all represented by a numerical value (a binary number). These functions:

(a) can be implemented as precisely as required by using as many bits of a binary word as required to achieve the required precision.

(b) can be replicated exactly.

(c) do not vary with time (aging), temperature, or signal level.

(d) can be implemented in VHSIC in a smaller physical volume than a corresponding prior art analog receiver.

These are the principal advantages of the digital implementation of a receiver over the analog implementation of a receiver.

Figure 3:
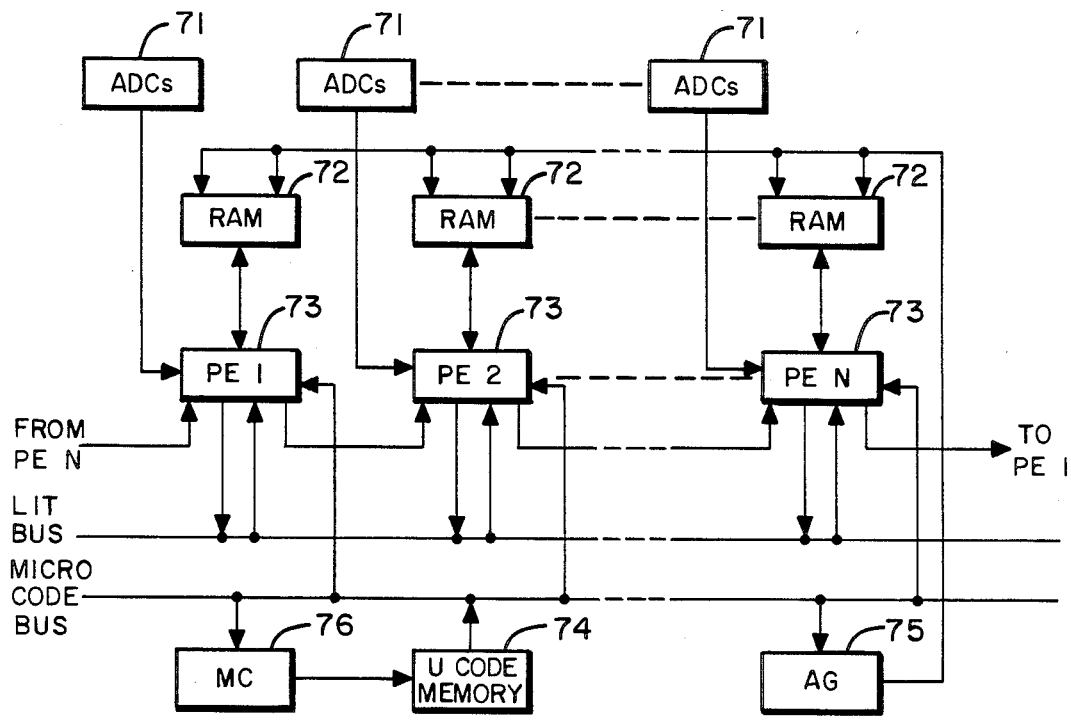
FIG. 3 is a block diagram illustrating a practical digital implementation of a wide dynamic range receiver in accordance with the present invention.

FIG. 3 is a specific implementation of this invention. Multiple ADC's (71) are used to input sampled signal data from multiple sensors to processor elements (73). A processing element (PE) is a single VHSIC device capable of performing floating point multiplications and additions each at a 25 MHz rate. VHSIC devices suitable for the purposes are commercially available through Texas Instruments Corp., Honeywell, Inc. and TRW, Inc. It is within the PE that the mathematical operations represented by Q. 3–EQ. 6 required to achieve the receiver functions of beamforming, filtering, gain control, and frequency translation are accomplished. Random access memories (72) are used to store input data and intermediate results of the mathematical operations.

The specific operation to be performed on each clock cycle by a PE is defined by a microcode word or instruction. This instruction is broadcast in parallel to each PE. Therefore, all PE's execute the same operation on each clock cycle. A microcode controller (76) is used to generate the address for each instruction which is stored in the microcode memory (74). The microcode controller can be a simple counter and can be implemented by a single integrated circuit. The addresses for the random access memories (72) are generated by the address generator (75). The address generator is also a counter implemented as a single integrated circuit.

The number of PE's required to implement a receiver is dependent upon the specific requirements of the receiver. A specific receiver application will require a specific number of multiplications and additions to be performed per unit of time. Each PE in FIG. 3 is capable of performing 25 million floating point multiplications and additions per second. Any specific receiver requirement can therefore be realized by implementing the appropriate number of PE's and associated random access memory.

Prior art receiver systems have employed digital processing techniques to implement receiver functions. These receivers had the disadvantage of limited dynamic range as a result of the relatively low sample frequency, FS. (See EQ. 2.) The present invention obviates this disadvantage by providing digital processors capable of performing multiplication and addition at a very high rate, thereby allowing the use of a high sample frequency, FS, to increase the dynamic range of the receiver. (See EQ. 2.) It can be seen from equation 2 that the dynamic range can be increased without limit as the sample frequency, FS, is increased without limit. However, the computational rate of the digital processing electronics (see FIG. 2) also increases linearly with the sample frequency.

This invention employs a technique which will be referred to as "decimation" to minimize the computational rate required of the digital processing electronics (see FIG. 2). Decimation can be applied to all filtering operations. Decimation is the process by which the output signal sample rate of a filtering operation is 1/N times the input signal sample rate where N is an integer. Decimation by N is accomplished by computing the filter output at each occurrence of N new signal samples into the filter operation. (See EQ. 4, supra.) Referring to EQ. 2, supra, the dynamic range at the output of the filter operation is maintained by increasing the number of bits, n, used to represent the filter output to compensate for the reduction in the sample rate, FS, at the filter output. The multiplier and accumulators internal to the processing elements (73) (see FIG. 3) are designed to provide the required increased resolution or accuracy for the filter output. This is accomplished by designing the multiplier with a sufficiently large number of bits for each of the two input operands and designing the accumulator with a sufficiently large number of bits to maintain the required accuracy during the summation operation on the multiplier output.

It is practical to design multipliers and accumulators with a sufficiently large number of bits to maintain the dynamic range for all receiver functions from the input to the receiver to the output of the receiver. The need for gain control as in the prior art system of FIG. 1 is therefore eliminated by this invention.

The receiver functions of beamforming, filtering, frequency translation and gain control are all linear operations. Because of this, the order in which these operations are performed on the signal can be interchanged. This invention utilizes the linearity characteristic of the receiver functions to optimize the design of the digital processing electronics for a specific receiver application. The optimum design is defined to be that which minimizes the computational rate required for the digital processing electronics and is achieved for a specific receiver application when the functions of beamforming, filtering, frequency translation and gain control are performed in the order which minimizes the computational rate required of the digital processing electronics.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to equipment details and operating procedures, can be accomplished without departing from the scope of the invention itself.

What is claimed is:

1. A wide dynamic range digital receiver system comprising, in combination:
   (a) a plurality of N sensors spatially disbursed relative to an energy source for converting incident energy into electrical signal waveforms;
   (b) amplifying and filtering means individually coupled to said plurality of sensors for effectively eliminating spurious signals from a predetermined frequency band;
   (c) noise generating means coupled to the output of said amplifying and filtering means for superimposing noise of a predetermined frequency onto the output from said amplifying and filtering means;
   (d) analog-to-digital converter means for converting the amplified and filtered output from said amplifying and filtering means for each of said sensors to a digital representation at a sampling rate, $1/\Delta t$ which is high in comparison to the bandwidth of said electrical signals;
   (e) digital data processing means coupled to receive the output from said analog-to-digital converter means, beamforming coefficients $B_i$, filter coefficients, $F_i$, and gain control coefficients, $A$, for repeatedly performing a sum of the products computation in generating the receiver functions of beamforming, filtering, gain control and frequency band translation in accordance with the formulas $$S_j = \sum_{i=1}^{N} S_i(m, j\Delta t)(B_i)$$

where $S_j$ is the jth output of the beamformer, $S_1(m, j\Delta t)$ is a sample of said electrical signal at time $m, j\ \Delta t$, and $\Delta t$ is the time between signal samples form the analog-to-digital converter means, and $B_i$ is a complex weighting factor applied to the ith sensor signal, $$S_p = \sum_{i=1}^{k} (S_{p-k+i})(F_i)$$

where $S_p$ is the pth output sample of the filter, $F_i$ is the ith complex filter coefficient representing the ith sample of the filter impulse response, $S_{p-k+i}$ is the $(p-k+i)$th sample of the input signal to the filter and k is the number of samples used to indicate the impulse response of the filter $$S_{i,o} = S_i A$$

where $S_{i,o}$ is the ith output signal sample following gain control and $S_i$ is the ith input signal sample, $$S_{s,o} = (S_s)(C_{q+s}) + (S_s)(S_{q+s})$$

where $S_{s,o}$ is the sample output of the frequency translation, $S_s$ is the sth sample of the input signal $(C_{q+s})$ and $(S_{q+s})$ are the $(q+s)^{th}$ samples of the continuous signal Cos $f_c$ and Sin $f_c$, respectively, and $f_c$ is the center frequency of the filter.

2. The wide dynamic range digital receiver as in claim 1 wherein the amplitude of said noise is about five times the quantization level of said analog to digital converter.

* * * * *